Patented Oct. 10, 1922.

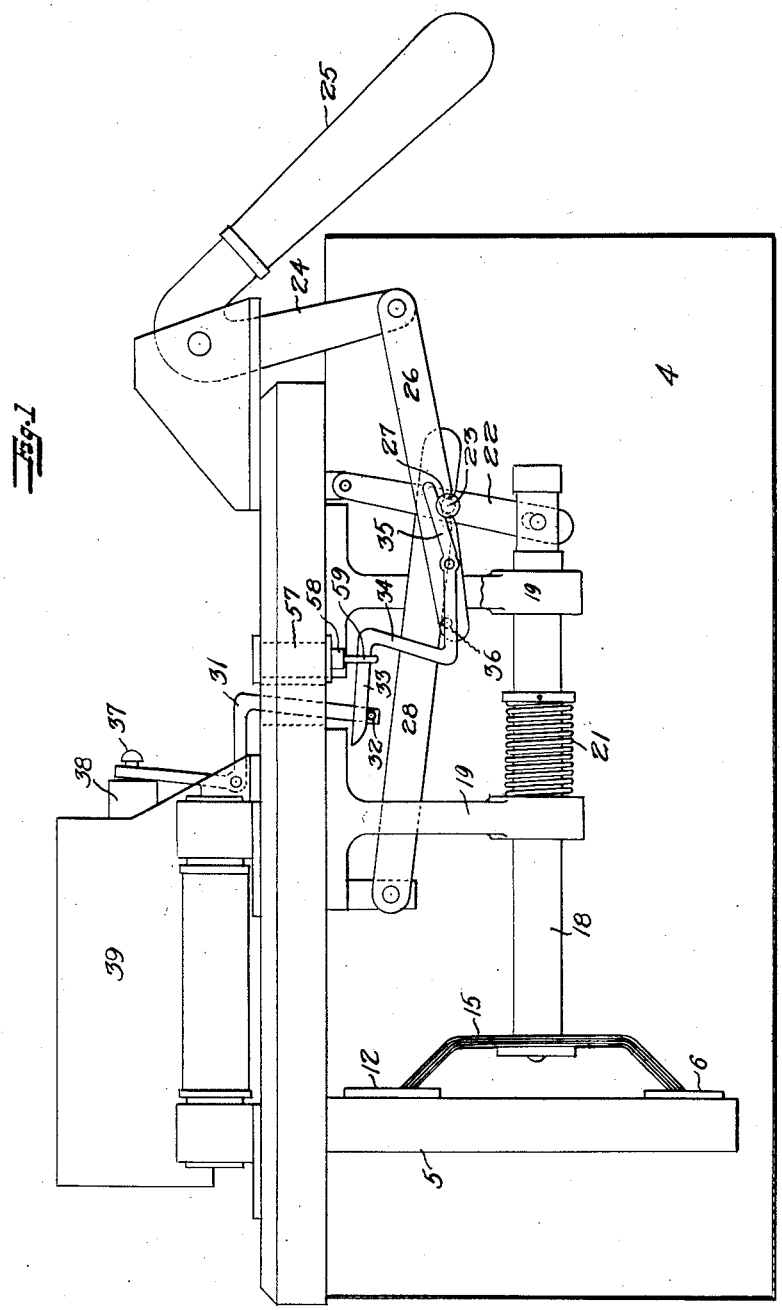

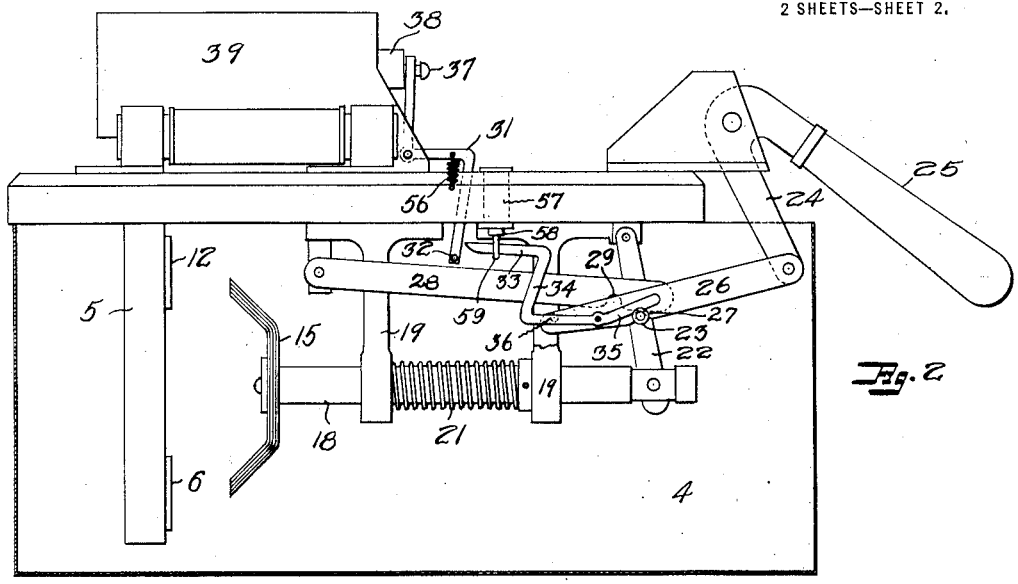
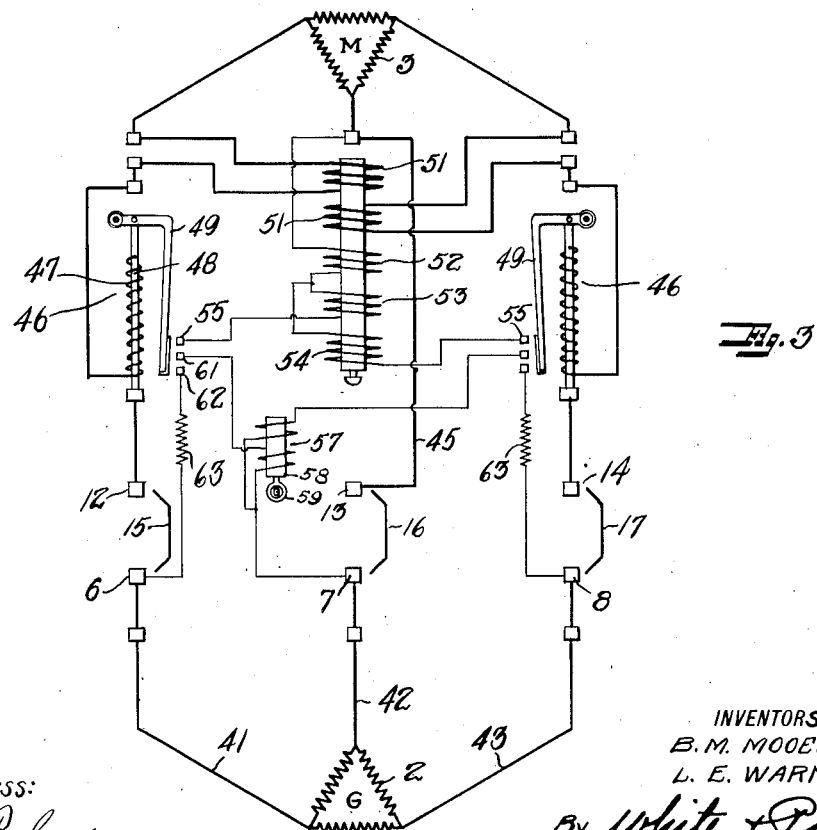

1,431,678

UNITED STATES PATENT OFFICE.

BENJAMIN M. MOOERS, OF SAN FRANCISCO, AND LAWRENCE E. WARNER, OF BERKELEY, CALIFORNIA, ASSIGNORS TO MOTOR PROTECTOR MANUFACTURING COMPANY, OF SAN FRANCISCO, CALIFORNIA, A CORPORATION OF CALIFORNIA.

CIRCUIT BREAKER.

Application filed December 27, 1917. Serial No. 209,026.

*To all whom it may concern:*

Be it known that we, BENJAMIN M. MOOERS and LAWRENCE E. WARNER, citizens of the United States, and residents, respectively, of the city and county of San Francisco, and of Berkeley, Alameda County, both in the State of California, have invented a certain new and useful Circuit Breaker, of which the following is a specification.

The invention relates to circuit breakers which operate to open the electric circuit when the current in said circuit approaches a critical value.

An object of the invention is to provide means for opening an electric circuit containing electrical apparatus when the temperature of such apparatus or certain portions thereof approaches a dangerous value and for preventing the circuit from being closed as long as such dangerous temperature values obtain in the apparatus.

Another object of the invention is to provide a circuit closing switch which is closed by a handle and means which prevents the handle from engaging the switch when dangerous temperature values obtain in the apparatus.

The invention possesses other advantageous features, some of which, with the foregoing, will be set forth at length in the following description, where we shall outline in full, that form of the invention which we have selected for illustration in the drawings accompanying and forming part of the present specification. In said drawings we have shown one specific embodiment of our generic invention, but it is to be understood that the invention as expressed in the claims may be embodied in a plurality of forms. In the drawings we have shown the invention as applied to an oil switch, but it is to be understood that it is applicable with equal efficiency to an air switch.

Referring to said drawings:

Figure 1 is a side view of the circuit breaker showing the position of the parts with the switch closed.

Fig. 2 is a side view of the circuit breaker showing the position of the parts with the switch open.

Fig. 3 is a diagrammatic representation of the electrical connections of the circuit breaker.

Devices have heretofore been employed for releasing or opening a switch in an electric circuit containing electric apparatus, when the temperature of the apparatus or a portion thereof reached a predetermined maximum, thereby preventing destruction of the apparatus or the windings thereof by abnormal temperatures. Frequently, however, after the switches have been opened, operators have closed them before the apparatus has cooled and have forcibly held the switches in, so that the protective apparatus could not operate and have thereby caused the apparatus or the windings thereof to burn out. An object of our invention, therefore, is to provide means which prevents the switch from being closed until the temperature of the apparatus or a part thereof has dropped to such lower value that it will not be deleteriously affected by the closing of the circuit.

The protective apparatus of this invention is usually arranged on a switch board or at some other point remote from the appartus being protected and is preferably so constructed that its temperature varies directly with the temperature of a selected portion of the protected apparatus, or that part of a conductor in an apparatus which has the least heat emissivity. The protective device is arranged in the circuit connected to the electrical apparatus and includes a conductor which is preferably arranged in series in the circuit, and the heating conductor is heat-insulated in substantially the same degree as those conductors in the electrical apparatus which have the least heat emissivity, so that the temperature of the device always corresponds to the highest temperature which exists in the apparatus. When a temperature is reached in the protective device which corresponds to an abnormal or destructive temperature within the apparatus, the device operates to open the circuit.

In the drawings we have shown the invention as applied to protecting a three-phase motor, but it is to be understood that the invention is applicable to direct current or to alternating current of one or more phases. Current is derived from the alternating current generator 2 and is supplied to the alternating current motor 3, which is protected against overheating by the system of our invention.

The switch is of the oil switch type, and is arranged within a suitable closed box or tank 4, preferably made of metal and containing sufficient oil to submerge the switch contacts. The switch-operating mechanism is also arranged within the tank 4, so that it may not be improperly manipulated. Arranged in the tank on a suitable insulating support 5 are the terminal plates 6, 7, 8 and 12, 13, 14. The circuits between the pairs of terminals 6—12, 7—13 and 8—14 are closed by the contact brushes 15, 16, 17 carried on the rods 18 of insulating material which are preferably connected together to form a frame. The rods 18 are slidable in the brackets 19 and are normally pressed backward, in a direction to open the switch, by springs 21. Pivoted to the frame and to the upper wall of the tank is a lever 22, which is provided intermediate its ends with a projection, preferably consisting of a grooved roller 23. The rods are moved to close the switch by the pivoted lever 24, provided on its exterior end with the handle 25 and on its inner end with the link 26 which rides in the grooved roller 23. The link is provided with a notch or depression 27, which fits over the roller thereby attaching the link to the lever 22, so that downward movement of the handle causes the switch to be closed.

Means are provided for holding the switch in the closed position against the pressure of the springs 21. Pivoted to a suitable support within the tank is a latch 28 riding in the grooved roller 23 and provided with a depression 29 which surrounds and holds the roller when the lever 22 is moved forward a sufficient distance to bring the brush contacts into contact with the terminals.

Means are provided for raising the latch 28 and the link 26 to move the depressions therein out of engagement with the grooved roller, to permit the switch to fly open, when a deleterious temperature is produced in the motor or other electrical apparatus being protected. Pivoted to the top cover of the tank is a lever 31, which extends into the tank and which is provided on its lower end with a pin 32, which, when the switch is closed, underlies the horizontal arm 33 of the trigger 34. The trigger is pivoted to the link 26 and has an arm 35 which overlies the grooved roller 23, so that when the arm 33 is raised, the link 26 is lifted to raise the depression 27 from the roller 23. The link 26 is provided with a pin 36 underlying the latch 28, so that the latch is raised as the link is raised, thereby releasing the lever 22 and allowing the switch to fly open.

Engaging the lever 31 at its upper end is a pin 37 secured to the core 38 of the solenoid 39, which is arranged to be energized when a deleterious temperature obtains in the electrical apparatus in circuit, and thereby releases the switch. The three supply leads 41—42—43 are connected to the terminal plates 6, 7 and 8 respectively, and the terminal plate 13 of the central lead is connected directly to the motor 3 by the lead 45. The plates 12 and 14 are connected to the motor through the temperature-operated relays 46. Each relay comprises a coiled conductor 47, in thermal communication with a thermostatic element, which in the present instance comprises a metallic rod 48 around which the conductor 47, duly insulated, is wrapped and to which it is connected at its end. The lower end of the rod 48 is fixed and is connected to the plate 12 and the upper end is pivoted to a lever 49 which is moved by variations in the length of the rod, due to temperature changes. The conductor 47 is connected to the motor, preferably through a coil 51 forming part of the solenoid, so that a great excess of current will energize the solenoid sufficiently to immediately trip the switch. The solenoid is provided with a three-phase winding 52—53—54 so arranged that two of the windings are always brought into operation to move the core 38. The lever 49 is arranged to engage a contact 55 which is connected to the coil 53 or 54 of the solenoid, so that when the circuit is closed at contact 55, coils 52 and 53 or 54 of the solenoid are energized and the core is moved to operate the trigger 34 and release the switch. As soon as the switch opens, the solenoid circuit is broken and the spring 56, attached to the lever 31, moves the core back to normal position. The thermal relay is enclosed in a casing of heat insulating material, so that the temperature of the conductor 47 therein corresponds directly with the temperature of the hottest part of the windings in the motor and the relay is so arranged that it operates to close the contact 49—55 when a certain maximum temperature obtains in the hottest part of the motor winding.

Means are provided for preventing the closing of the switch after it has opened and during the time of high temperature in the motor by preventing the engagement of the handle with the brush contact carrying frame. Mounted on the top of the tank is a solenoid 57, in which is disposed a core 58 provided on its lower end with an eye 59 encircling the horizontal arm 33 of the trigger 34, so that when the solenoid 57 is energized, the horizontal arm is held elevated, thereby preventing the notches 27 and 29 in the link 26 and latch 28 respectively, from engaging the roller 23. When this condition exists, the handle 25 may be freely moved, but the connection between the handle and the switch cannot be made and consequently the switch cannot be moved. Arranged adjacent and adapted to be engaged by the lower end of the arm 49 when a deleterious temperature is approached, are two contacts 61—62, one of which is connected to the plate 7 through the solenoid 57 and the other of which is connected to the plate 6 or 8 through a resistance 63, so that the solenoid is energized during the time that the high temperature exists. The current in the solenoid 57 is small and the pull exerted by the core is small, being sufficient to hold the trigger raised, but not sufficient to be relied on to operate the trigger. This arrangement provides means operative during the time of high temperature in the motor for preventing the handle from reclosing the switch. When the temperature drops, the circuit through the solenoid 57 is opened, allowing the arm 33 to descend, so that the notch in link 26 may engage the roller 23, and thereby permit the closing of the switch.

We claim:

1. A protective device for an electric circuit containing electrical apparatus, comprising a switch, a handle for closing the switch and means operative by an increase in temperature of the apparatus due to current flow for releasing the switch from the handle, and preventing engagement between the handle and the switch.

2. A protective device for an electric circuit containing electrical apparatus, comprising a switch, a handle for closing said switch and means operative by the heating effect of the current in the apparatus for preventing engagement of the switch by the handle.

3. A protective device for an electric circuit containing electrical apparatus, comprising a switch, a spring opposing the closing movement of said switch, a handle for closing said switch and being releasable from said switch, and means operative during the presence of a high temperature in the apparatus caused by current flow for preventing the handle from engaging the switch.

4. A protective device for an electric circuit containing electrical apparatus comprising a switch, a handle for manually closing the switch arranged to be released from the switch, and means operative by the heating effect of the current flowing through the apparatus for releasing the switch and for preventing the closing of the switch during the presence of a high temperature in the apparatus.

5. A protective device for an electric circuit containing electrical apparatus, comprising a switch, a spring opposing the closing movement of the switch, a handle for closing said switch, a latch for holding the switch in closed position, and means operative during the presence of a high temperature in the apparatus caused by current flow for releasing the latch and handle from the switch, and for preventing the engagement of the switch by the handle.

6. A protective device for an electric circuit containing electrical apparatus, comprising a switch, a handle for closing the switch, and means operative by the heating effect of the current in the circuit for releasing the handle from the switch and for preventing the engagement of the switch by the handle.

7. A protective device for an electric circuit containing electrical apparatus, comprising a switch, means for manually closing said switch, and means operative by the heating effect of the current in the circuit for holding the closing means out of engagement with the switch.

8. A protective device for an electric circuit containing electrical apparatus, comprising a casing, a switch arranged in said casing, means for closing said switch extending from said casing, and means operative by an increase in temperature of the apparatus caused by current flow for releasing said switch, and for holding the closing means out of engagement with the switch.

9. A protective device for an electric circuit containing electrical apparatus, comprising a casing, a switch arranged in said casing, means for closing said switch extending from said casing, and means operative by an increase in temperature of the apparatus caused by current flow for releasing said switch, and operative during such increase in temperature for holding the closing means out of engagement with the switch.

10. A protective device for an electric circuit containing electrical apparatus, comprising a switch, means for manually closing the switch, and means operative by an increase in temperature of the apparatus due to current flow to a temperature approaching a destructive temperature for releasing the switch and for holding the closing means out of engagement with the switch during the presence of such temperature.

In testimony whereof, we have hereunto set our hands at San Francisco, California, this 19th day of December, 1917.

BENJAMIN M. MOOERS.
LAWRENCE E. WARNER.

In presence of—
H. G. PROST.